(12) United States Patent
de Sereville (10) Patent No.: US 10,725,850 B2
(45) Date of Patent: *Jul. 28, 2020

(54) ESTIMATING RISK TO A COMPUTER NETWORK FROM A HIGH RISK FAILURE THAT OCCURRED ON A FIRST OR SECOND COMPUTER SYSTEM

(71) Applicant: International Business Machines Corporation, Armonk, NY (US)

(72) Inventor: Etienne de Sereville, Saint Germain en Laye (FR)

(73) Assignee: International Business Machines Corporation, Armonk, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/636,884

(22) Filed: Jun. 29, 2017

(65) Prior Publication Data

US 2017/0329661 A1 Nov. 16, 2017

Related U.S. Application Data

(63) Continuation of application No. 14/260,852, filed on Apr. 24, 2014, now Pat. No. 9,747,151, which is a
(Continued)

(30) Foreign Application Priority Data

Nov. 19, 2004 (EP) .................................. 04300803

(51) Int. Cl.
*G06F 11/07* (2006.01)
*G06Q 10/06* (2012.01)
*G06Q 40/08* (2012.01)

(52) U.S. Cl.
CPC ....... *G06F 11/079* (2013.01); *G06Q 10/0635* (2013.01); *G06Q 40/08* (2013.01)

(58) Field of Classification Search
None
See application file for complete search history.

(56) References Cited

U.S. PATENT DOCUMENTS

| 5,500,529 A | 3/1996 | Tawil et al. |
| 5,594,638 A | 1/1997 | Iliff |
| (Continued) | | |

OTHER PUBLICATIONS

Mangus, Alphonse; "Analyse numerique 1a", Institute de Mathematique Pure et Appliquee, Universite Catholique de Louvain, MATH2171, 2002-2003 French document and EnglishTranslation of Chapter 2.
(Continued)

*Primary Examiner* — Stephanie Z Delich
(74) *Attorney, Agent, or Firm* — Schmeiser, Olsen & Watts, LLP; Michael Petrocelli (57) ABSTRACT

First and second Tchebychev polynomial curves are generated and pass through first and second data points representing previous failures of a first and second computer system of a computer network, respectively. The coordinates of each first and second data point denote a time of occurrence of the failure of the first and second computer system and a severity of the failure of the first and second computer system, respectively. A third Tchebychev polynomial curve passing through the peaks of the first and second Tchebychev polynomial curves is generated. A highest peak of the third Tchebychev polynomial curve is identified and determined to be a high risk failure that occurred on the first or second computer system and generates significant risk to the computer network, causing other computers to add redundancy to minimize the significant risk to the computer network from a future occurrence of the high risk failure.

12 Claims, 5 Drawing Sheets

Related U.S. Application Data continuation of application No. 11/272,299, filed on Nov. 10, 2005, now abandoned.

(56) References Cited

U.S. PATENT DOCUMENTS

| | | |
|---|---|---|
| 6,363,496 B1 | 3/2002 | Kwiat |
| 6,441,823 B1 | 8/2002 | Ananya |
| 7,221,975 B2 | 5/2007 | Lindstrom |
| 2002/0104014 A1 | 8/2002 | Zobel et al. |
| 2005/0021360 A1 | 1/2005 | Miller et al. |
| 2005/0027571 A1 | 2/2005 | Garmarnik et al. |
| 2005/0096953 A1 | 5/2005 | Washington et al. |
| 2005/0144188 A1 | 6/2005 | Bailey et al. |
| 2005/0154561 A1 | 7/2005 | Legault et al. |
| 2005/0246590 A1 | 11/2005 | Lancaster |
| 2006/0100958 A1 | 5/2006 | Cheng et al. |
| 2006/0111927 A1 | 5/2006 | de Sereville |
| 2011/0047044 A1 | 2/2011 | Wright et al. |
| 2014/0325289 A1 | 10/2014 | de Sereville |

OTHER PUBLICATIONS

Kervern. G.; "Cindynamique Les Pistes D'Une formalisation", Ecole Des Mines D'Aibi Ecole Des Mines De Saint-Etienne, Sep. 1999, French document and English Translation of the "Introduction" and "Foundation Epistemologiques".

Office Action (dated Sep. 30, 2016) for U.S. Appl. No. 14/260,852, filed Apr. 24, 2014.

Amendment (dated Dec. 30, 2016) for U.S. Appl. No. 14/260,852, filed Apr. 24, 2014.

Notice of Allowance (dated Apr. 27, 2017) for U.S. Appl. No. 14/260,852, filed Apr. 24, 2014.

ESTIMATING RISK TO A COMPUTER NETWORK FROM A HIGH RISK FAILURE THAT OCCURRED ON A FIRST OR SECOND COMPUTER SYSTEM

CROSS REFERENCE TO RELATED APPLICATION

This application is a continuation application claiming priority to Ser. No. 14/260,852, filed Apr. 24, 2014, now U.S. Pat. No. 9,747,151, issued Aug. 29, 2017, which is a Continuation application Ser. No. 11/272,299 which was filed on Nov. 10, 2005.

TECHNICAL FIELD

The present invention relates to estimation of disasters in infrastructures, such as computer networks.

BACKGROUND

Risk analysis predicts likelihood of disasters, such as severe failures of an Information Technology ("IT") infrastructure, that an organization may face, and the consequences of such failures. IT disasters, such as an e-mail server failure or other computer network failure, can impact the organization's ability to operate efficiently.

Known cindynic theory (science of danger) is applicable in different domains. For example, cindynics has been used to detect industrial risks and can also be used in the area of computer network (including computer hardware and software) risks. According to the modern theory of description, a hazardous situation (cindynic situation) has been defined if the field of the "hazards study" is clearly identified by limits in time (life span), limits in space (boundaries), and limits in the participants' networks involved and by the perspective of the observer studying the system. At this stage of the known development of the sciences of hazards, the perspective can follow five main dimensions.

A first dimension comprises memory, history and statistics (a space of statistics). The first dimension consists of all the information contained in databases of large institutions constituting feedback from experience (for example, electricity of France power plants, Air France flights incidents, forest fires monitored by the Sophia Antipolis center of the Ecole des Mines de Paris, and claims data gathered by insurers and reinsurers).

A second dimension comprises representations and models drawn from the facts (a space of models). The second dimension is the scientific body of knowledge that allows computation of possible effects using physical principles, chemical principles, material resistance, propagation, contagion, explosion and geo-cindynic principles (for example, inundation, volcanic eruptions, earthquakes, landslides, tornadoes and hurricanes).

A third dimension comprises goals & objectives (a space of goals). The third dimension requires a precise definition by all the participants and networks involved in the cindynic situation of their reasons for living, acting and working. It is arduous to clearly express why participants act as they do and what motivates them. For example, there are two common objectives for risk management—"survival" and "continuity of customer (public) service". These two objectives lead to fundamentally different cindynic attitudes. The organization, or its environment, will have to harmonize these two conflicting goals.

A fourth dimension comprises norms, laws, rules, standards, deontology, compulsory or voluntary, controls, etc. (a space of rules). The fourth dimension comprises all the normative set of rules that makes life possible in a given society. For example, socient determined a need for a traffic code when there were enough automobiles to make it impossible to rely on courtesy of each individual driver; the code is compulsory and makes driving on the road reasonably safe and predictable. The rules for behaving in society are aimed at reducing the risk of injuring other people and establishing a society. On the other hand, there are situations, in which the codification is not yet clarified. For example, skiers on the same ski-slope may have different skiing techniques and endanger each other. In addition, some skiers use equipment not necessarily compatible with the safety of others (cross country sky and mono-ski, etc.)

A fifth dimension comprises value systems (a space of values). The fifth dimension is the set of fundamental objectives and values shared by a group of individuals or other collective participants involved in a cindynic situation. For example, protection of a nation from an invader was a fundamental objective and value, and meant protection of the physical resources as well as the shared heritage or values. Protection of such values may lead the population to accept heavy sacrifices.

A number of general principles, called axioms, have been developed within cindynics. The cindynic axioms explain the emergence of dissonances and deficits.

Cindynic Axiom 1—Relativity:

The perception of danger varies according to each participant's situation. Therefore, there is no "objective" measure of danger. This principle is the basis for the concept of situation.

Cindynic Axiom 2—Convention:

The measures of risk (traditionally measured by the vector Frequency—Severity) depend on convention between participants.

Cindynic Axiom 3—Goals Dependency:

Goals can directly impact the assessment of risks. The participants may have conflicting perceived objectives. It is essential to try to define and prioritise the goals of the various participants involved in the situation. Insufficient clarification of goals is a current pitfall in complex systems.

Cindynic Axiom 4—Ambiguity:

There is usually a lack of clarity in the five dimensions previously mentioned. A major task of prevention is to reduce these ambiguities.

Cindynic Axiom 5—Ambiguity Reduction:

Accidents and catastrophes are accompanied by brutal transformations in the five dimensions. The reduction of ambiguity (or contradictions) of the content of the five dimensions will happen when they are excessive. This reduction can be involuntary and brutal, resulting in an accident, or voluntary and progressive achieved through a prevention process.

Cindynic Axiom 6—Crisis:

A crisis results from a tear in the social cloth. This means a dysfunction in the networks of the participants involved in a given situation. Crisis management may comprises an emergency reconstitution of networks.

Cindynic Axiom 7—Ago-Antagonistic Conflict:

Any therapy is inherently dangerous. Human actions and medications are accompanied by inherent dangers. There is always a curing aspect, reducing danger (cindynolitic), and an aggravating factor, creating new danger (cindynogenetic).

The main utility of these principles is to reduce time lost in unproductive discussions on the following subjects:

How accurate are the quantitative evaluations of catastrophes—Quantitative measures result from conventions, scales or unit of measures (axiom 2); and Negative effects of proposed prevention measures—In any action positive and negative impacts are intertwined (axiom 7).

Consequently, Risk Analysis, viewed by the cindynic theory, takes into account the frequency that the disaster appears (probability), and its real impact on the participant or organization (damage).

Figure 1:
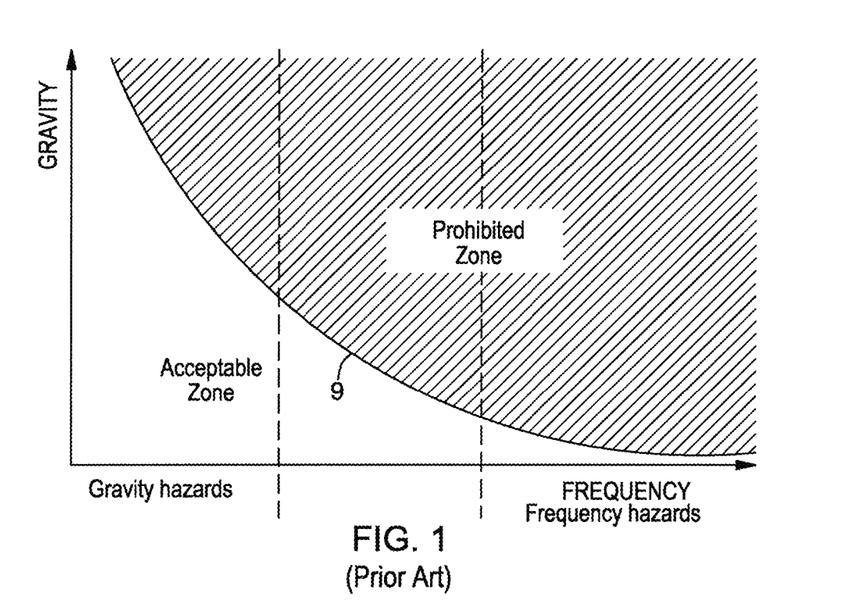
FIG. 1 illustrates an example of a prior art Farmer's curve.

FIG. 1 shows a known "Farmer" curve where disasters are placed on a graph showing the relationship between probability and damage.

Disaster study is a part of Risk Analysis; its aim is to follow the disaster evolution. Damages are rated in term of cost or rate, with time. Let "d" denote the damage of a given disaster and "f" denote the frequency of such a disaster. From a quantitative point of view, it is common to define a rating "R" of the associated risk as: R=d×f. In practice, often, the perception of risk is such that the relevance given to the damaging consequences "d" is far greater than that given to its probability of occurrence f so that, the given "R=d×f" is slightly modified to: $R=d^k \times f$ with k>1. So, numerically larger values of risk are associated with larger consequences.

Disasters are normally identified by IT infrastructure components. These components follow rules or parameters and may generate log traces. Typically, disaster information is represented in the form of log files. The disaster rating and scale are relative rather than absolute. The scale may be, for example, values between "1" and "10": "1" being a minor disaster of minimal impact to the disaster data group and "10" being a major disaster having widespread impact. The logging function depends of the needs of monitoring systems and data volumes and, in some cases, delay due to legal obligations.

The known Risk Analysis uses a simple comparison between values found by the foregoing operations, in order to extract statistics. Also, a full Risk Analysis of a IT infrastructure required a one to one analysis of all the data held on disasters. By comparing each disaster with each of the other disaster it was possible to calculate the likelihood of further disasters. This process is computationally expensive and also requires a significant amount of a computer's Random Access Memory (RAM).

An object of the present invention is to estimate risk of disaster of an infrastructure.

Another object of the present invention is to facilitate estimation of risk of disaster of an infrastructure.

SUMMARY OF THE INVENTION

The present invention is directed to a method, system and computer program for estimating risk of a future disaster of an infrastructure. Times of previous, respective disasters of the infrastructure are identified. Respective severities of the previous disasters are determined. Risk of a future disaster of the infrastructure is estimated by determining a relationship between the previous disasters, their respective severities and their respective times of occurrence.

In accordance with a feature of the present invention, the risk is estimated by generating a polynomial linking severity and time of occurrence of each of the previous disasters. The polynomial can be generated by approximating a Tchebychev polynomial.

In accordance with other features of the present invention, the risk is also estimated by modifying the polynomial by extracting peaks in a curve representing the polynomial, regenerating the polynomial using the extracted peaks and repeating the modifying step until a number of extracted peaks is less than or equal to a predetermined value.

DETAILED DESCRIPTION OF THE INVENTION

The present invention will now be described in detail with reference to the Figures. A Tchebychev analysis program 500 (shown in FIGS. 5 and 6) executing in a risk estimation computer 20 generates a continuous polynomial curve with a corresponding polynomial equation. Program 500 takes derivatives of the polynomial equation. When the derivative of the continuous curve is null, the risk reaches its maximum. The construction of the polynomial equation is shown below.

For i≥1 and j≥1, a Tchebychev polynomial having "n" points is given by:

$$P_n(x) = \sum_{i=1}^{n}\left(y_i \prod_{j=1}^{n} \frac{(x-x_j)}{(x_i-x_j)}\right)$$

For example, to calculate the polynomial between two points, Point1 and Point2, having coordinates $(x_1, y_1)$ and $(x_2, y_2)$ respectively in space (x,y), the formula is: n=2, $$P_2(x) = y_1 \frac{(x-x_2)}{(x_1-x_2)} + y_2 \frac{(x-x_1)}{(x_2-x_1)}$$

Where $P_2(x_1)=y_1$, and $P_2(x_2)=y_2$.

To calculate the polynomial between 3 points: Point1(x1, y1), Point2(x2,y2) and Point3(x3,y3), the formula is: n=3, $$P_3 = y_1 \frac{(x-x_2)(x-x_3)}{(x_1-x_2)(x_1-x_3)} + y_2 \frac{(x-x_1)(x-x_3)}{(x_2-x_1)(x_2-x_3)} + y_3 \frac{(x-x_1)(x-x_2)}{(x_3-x_1)(x_3-x_1)}$$

where $P_3(x_1)=y_1$, $P_3(x_2)=y_2$ and $P_3(x_3)=y_3$.

The Tchebychev polynomial is a continuous curve between "n" points.

Figure 5:
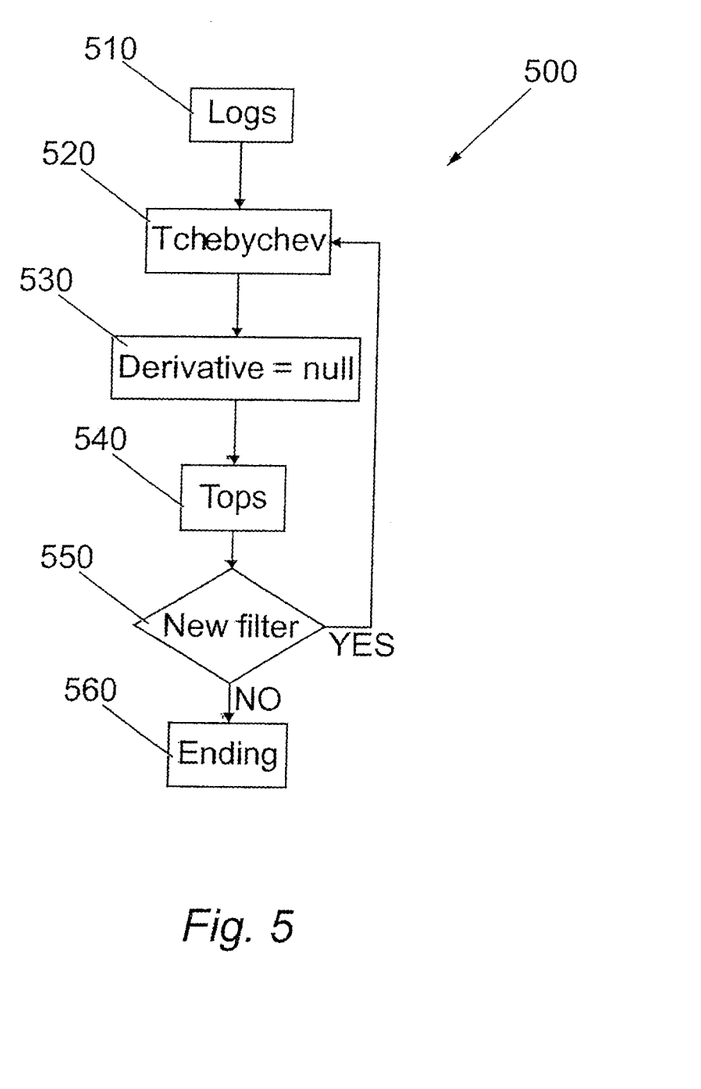
FIG. 5 is a flow diagram, including a flowchart and a block diagram, illustrating a program and system for generating polynomials according to the present invention.

Referring to FIG. 5, Tchebychev analysis program 500 receives identified disasters data 510 from an infrastructure which are then inputted to a Tchebychev approximation module 520. The Tchebychev module 520 calculates a polynomial from the identified disasters data 510. The polynomial is inputted to a derivative module 530. The derivative module 530 identifies peaks and troughs by identifying points which have a null derivative. The peaks having a null derivative are forwarded to a peaks (or tops) module 540. The peaks module 540 identifies the peaks by studying the sign of the derivative before and after each of the identified points. Where the sign of the derivative is positive before and negative after an identified point, a peak has been found. A new filter module 550 counts the number of identified peaks and compares this to a predetermined maximum. If there are more identified peaks than the maximum, the identified peaks are inputted to the Tchebychev module 520 and the process is repeated. If the number of peaks is less than or equal to the maximum the process stops (step 560).

Figure 2:
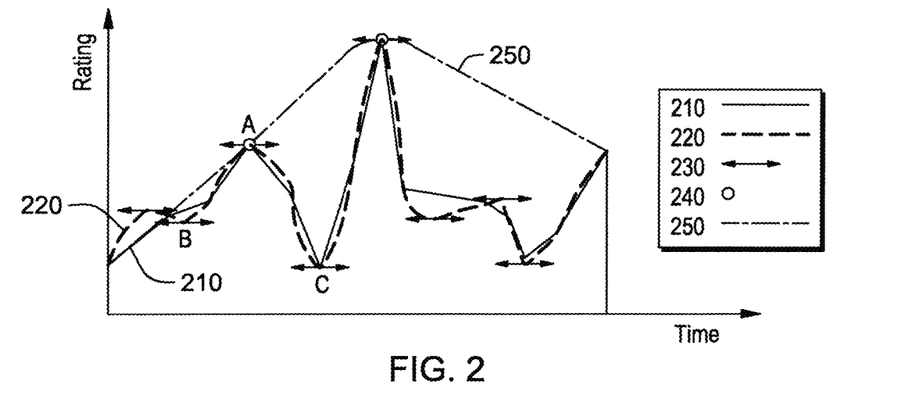
FIG. 2 illustrates the result of the Tchebychev's polynomials approximation's use.

FIG. 2 illustrates an example of results produced by program 500. An identified disasters trace 210 plots severity of a disaster against their time of occurrence. Program 500 then generates an approximation of Tchebychev's polynomials to obtain a first polynomial equation represented by a first polynomial curve 220. Program 500 then takes derivatives of first polynomial equation 220 to identify the points at which the derivative is equal to zero. Null derivative points 230 correspond to peaks and troughs on the polynomial curve. Program 500 identifies peaks by analyzing each null derivative point 230. If the polynomial values of the polynomial 220 before and after each null derivative point 230 are lower that the peak polynomial value at this point, a peak is identified. In this example, program 500 also identifies the extracted peaks 240 from the polynomial 220 through comparison with the identified disasters trace 210. Where a null derivative point 230 is identified as a peak, program 500 compares the null derivative point 230 to the value of identified disasters trace 210 before and after the null derivative point 230. Thus, program 500 identifies the extracted peaks 240 in FIG. 2. For example, point A is one of extracted peaks 240, B is the null derivative point 230 preceding A, and C is the null derivative point 230 following A. If the derivative is positive between A and B, and negative between A and C, point A is a peak. Furthermore, the values of the identified disasters trace 210 before and after point A are less than point A. Therefore point A is an extracted peak 240.

Program 500 then uses an approximation of Tchebychev's polynomials to create a modified polynomial 250 using points which have been identified as peaks and the start and end point. Program 500 further modifies polynomial 250 by repeating the process described above to identify peaks. In this case, there would be no further improvement but in other cases the process will preserve only the highest peaks.

Figure 3A:
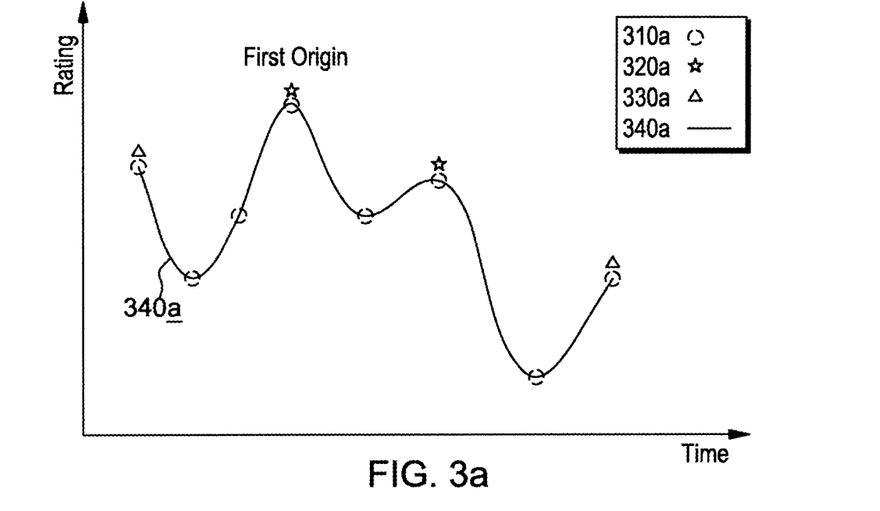
FIGS. 3a and 3b illustrate two polynomial curves showing the collected disaster information from a first origin and a second origin.
Figure 3B:
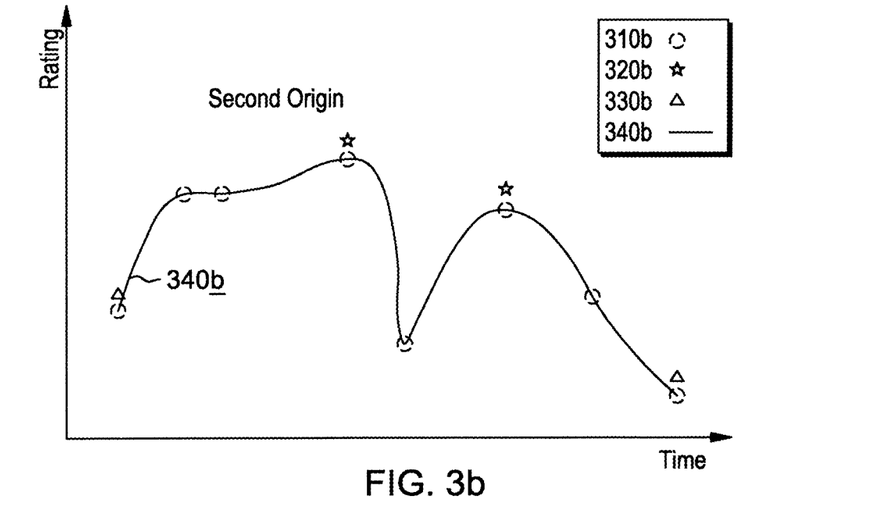

Referring now to FIGS. 3a and 3b, polynomial curves 340 show two collections of disaster information for two organizations (first origin and second origin) with each disaster 310 shown as a point on the polynomial curve 340. Program 500 identifies represented peaks 320 by the process described above to identify peaks from recovered data points. Each polynomial curve 340 has ends 330.

Figure 4:
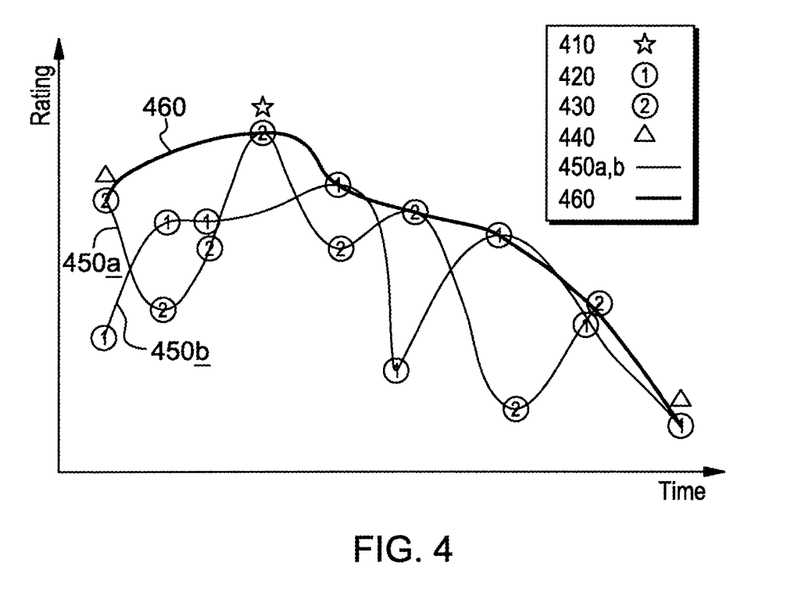
FIG. 4 illustrates the combining of the polynomial curves of FIG. 3 according to an embodiment of the invention.

Referring now to FIG. 4, the polynomial curves 450 represent the two polynomial curves of FIG. 3 (340). The first origin has disaster points 420 and the second origin has disaster points 430. Program 500 identifies peaks and ends of each of the polynomial curves 450 and extracts represented peaks. The new ends 440 are the ends from either of the polynomial curves 450 which are of greater gravity or greater extremity of time. Program 500 then uses the represented peaks from each polynomial curve 450 along with the new ends 440 to generate a merged polynomial 460 which represents disaster from the combined information of the first and second origin.

Figure 6:
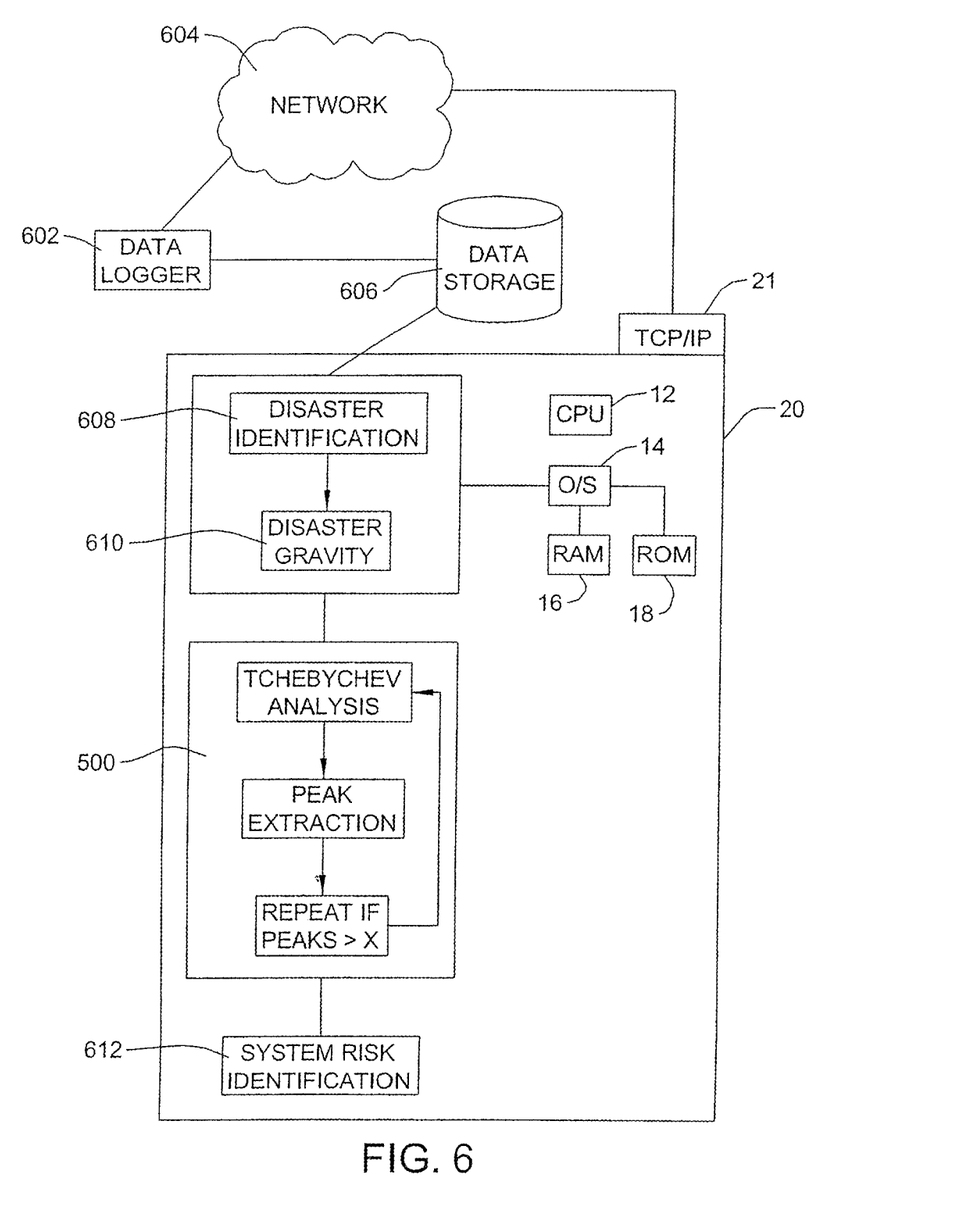
FIG. 6 illustrates a system according to the present invention for estimating risk of disaster of an infrastructure.

Referring now to FIG. 6, a data logger 602 which enables information, typically consisting of logged events, to be collected from a infrastructure network 604. The information from the data logger 602 is stored in a data storage 606. A disaster identification program 608 assesses the logged events to determine whether the event is deemed a disaster. For example, if the logged event indicates a failure of system hardware or software it may be logged as a disaster. A disaster gravity program 610 assesses each identified disaster generating disaster data. For example, as described previously, a disaster may be assigned a value between "1" and "10" corresponding to level of impact on the infrastructure 604. The disaster data is then inputted to Tchebychev analysis program 500 as described previously. The Tchebychev analysis program generates a risk analysis equation or data. Program 500 then analyzes the risk analysis data to identify one or more high risk disaster events. For example, after the Tchebychev analysis program 500 has completed the risk analysis, program 500 typically identifies a number of peaks corresponding to high risk events 612. These peaks/events can be identified as disasters which generate significant risk to the infrastructure 604. Measures can then be automatically, or otherwise, taken to minimise further risk. For example, the computer system 20 could instigate additional services on other computers or server of the network 604 to provide additional redundancy to cope with a particular high risk event. The high risk events 612 can also be displayed on a computer screen, or any type of visual display unit, to allow a user to view and obtain more information about the high risk events 612. In this manner, a disaster of greatest potential risk can be identified automatically.

The present invention may be embodied in a computer program (including program modules 608, 610, 500 and 612) comprising instructions which, when executed in computer 20, perform the functions of the system or method as described above. The computer 20 includes a standard CPU 12, operating system 14, RAM 16 and ROM 18. The program modules 608, 610, 500 and 612 are stored on computer readable disk storage 606 for execution by CPU 12 via computer readable memory 16. The program modules 608, 610, 500 and 612 can be loaded into computer 20 from a computer-readable storage device such as a magnetic disk or tape, optical device or DVD, or alternatively downloaded via network 604 via a TCP/IP adapter card 21.

Improvements and modifications may be incorporated without departing from the scope of the present invention.

What is claimed is:

1. A method of estimating risk of a future failure of a first and second computer system of a computer network and taking remedial action which minimizes the risk of the future failure of the first and second computer systems, said method comprising:

a processor generating a first Tchebychev polynomial curve passing through first data points respectively representing previous failures of the first computer system, and identifying peaks and ends of the first Tchebychev polynomial curve, each first data point having a first coordinate on a time axis and a second coordinate on a severity axis, said first and second coordinate of each first data point respectively denoting a time of occurrence of the failure of the first computer system and a severity of the failure of the first computer system, said times of occurrence of the first data points encompassing a time range from an earliest time of occurrence T1min to a latest time of occurrence T1max, of the previous failures of the first computer system;

said processor generating a second Tchebychev polynomial curve passing through second data points respectively representing previous failures of the second computer system, and identifying peaks and ends of the second Tchebychev polynomial curve, each second data point having a second coordinate on the time axis and a second coordinate on the severity axis, said first and second coordinate of each second data point respectively denoting a time of occurrence of the failure of the computer system and a severity of the failure of the second computer system, said times of occurrence of the second data points encompassing a time range from an earliest time of occurrence T2 min to a latest time of occurrence T2max, of the previous failures of the second computer system;

said processor generating a third Tchebychev polynomial curve passing through: (i) all of the peaks of both the first Tchebychev polynomial curve and the second Tchebychev polynomial curve, (ii) the first Tchebychev polynomial curve at time T1 min or the second Tchebychev polynomial curve at time T2 min, and (iii) the first Tchebychev polynomial curve at time T1 max or the second Tchebychev polynomial curve at time T2 max; and said processor identifying a highest peak of the third Tchebychev polynomial curve and determining that the identified highest peak is a high risk failure that occurred on the first or second computer system and is a disaster generating significant risk to the computer network and in response, causing other computers of the computer network to provide additional redundancy to minimize the significant risk to the computer network from a future occurrence of the high risk failure of the first and second computer systems.

2. The method of claim 1, said method further comprising:

said processor identifying an additional failure of the first computer system, said additional failure occurring within a predetermined time period of one of the failures of the first computer system, a severity of the one failure of the first computer system being greater than a severity of the additional failure; and said processor determining not to use the additional failure as a data point for generating the first Tchebychev polynomial based on (a) the additional failure occurring within the predetermined time of the one failure of the first computer system and (b) the severity of the one failure of the first computer system being greater than the severity of the additional failure.

3. The method of claim 1, wherein the first computer system comprises a first network of first computers including first software installed in the first computers, and wherein the second computer system comprises a second network of second computers including second software installed in the second computers.

4. The method of claim 1, wherein if time T1min is less than time T2 min then the third Tchebychev polynomial curve passes through the first Tchebychev polynomial curve at time T1min;

wherein if time T2 min is less than time T1min then the third Tchebychev polynomial curve passes through the second Tchebychev polynomial curve at time T2 min;

wherein if time T1min is equal to time T2 min then the third Tchebychev polynomial curve passes through whichever Tchebychev polynomial curve of the first and second Tchebychev polynomial curves has a higher severity at time T1 min;

wherein if time T1max is greater than time T2max then the third Tchebychev polynomial curve passes through the first Tchebychev polynomial curve at time T1max;

wherein if time T2max is greater than time T1max then the third Tchebychev polynomial curve passes through the second Tchebychev polynomial curve at time T2max;

wherein if time T1max is equal to time T2max then the third Tchebychev polynomial curve passes through whichever Tchebychev polynomial curve of the first and second Tchebychev polynomial curves has a higher severity at time T1max.

5. A computer program product, comprising a computer readable hardware storage device having computer readable program instructions stored therein, said program instructions executable by a processor to implement a method of estimating risk of a future failure of a first and second computer system of a computer network and taking remedial action which minimizes the risk of the future failure of the first and second computer systems, said method comprising:

said processor generating a first Tchebychev polynomial curve passing through first data points respectively representing previous failures of the first computer system, and identifying peaks and ends of the first Tchebychev polynomial curve, each first data point having a first coordinate on a time axis and a second coordinate on a severity axis, said first and second coordinate of each first data point respectively denoting a time of occurrence of the failure of the first computer system and a severity of the failure of the first computer system, said times of occurrence of the first data points encompassing a time range from an earliest time of occurrence T1 min to a latest time of occurrence T1max, of the previous failures of the first computer system;

said processor generating a second Tchebychev polynomial curve passing through second data points respectively representing previous failures of the second computer system, and identifying peaks and ends of the second Tchebychev polynomial curve, each second data point having a second coordinate on the time axis and a second coordinate on the severity axis, said first and second coordinate of each second data point respectively denoting a time of occurrence of the failure of the computer system and a severity of the failure of the second computer system, said times of occurrence of the second data points encompassing a time range from an earliest time of occurrence T2 min to a latest time of occurrence T2max, of the previous failures of the second computer system;

said processor generating a third Tchebychev polynomial curve passing through: (i) all of the peaks of both the first Tchebychev polynomial curve and the second Tchebychev polynomial curve, (ii) the first Tchebychev polynomial curve at time T1 min or the second Tchebychev polynomial curve at time T2 min, and (iii) the first Tchebychev polynomial curve at time T1 max or the second Tchebychev polynomial curve at time T2 max; and said processor identifying a highest peak of the third Tchebychev polynomial curve and determining that the identified highest peak is a high risk failure that occurred on the first or second computer system and is a disaster generating significant risk to the computer network and in response, causing other computers of the computer network to provide additional redundancy to minimize the significant risk to the computer network from a future occurrence of the high risk failure of the first and second computer systems.

6. The computer program product of claim 5, the method further comprising:

said processor identifying an additional failure of the first computer system, said additional failure occurring within a predetermined time period of one of the failures of the first computer system, a severity of the one failure of the first computer system being greater than a severity of the additional failure; and said processor determining not to use the additional failure as a data point for generating the first Tchebychev polynomial based on (a) the additional failure occurring within the predetermined time of the one failure of the first computer system and (b) the severity of the one failure of the first computer system being greater than the severity of the additional failure.

7. The computer program product of claim 5, wherein the first computer system comprises a first network of first computers including first software installed in the first computers, and wherein the second computer system comprises a second network of second computers including second software installed in the second computers.

8. The computer program product of claim 5, wherein if time T1min is less than time T2 min then the third Tchebychev polynomial curve passes through the first Tchebychev polynomial curve at time T1min;

wherein if time T2 min is less than time T1min then the third Tchebychev polynomial curve passes through the second Tchebychev polynomial curve at time T2 min;

wherein if time T1min is equal to time T2 min then the third Tchebychev polynomial curve passes through whichever Tchebychev polynomial curve of the first and second Tchebychev polynomial curves has a higher severity at time T1min;

wherein if time T1max is greater than time T2max then the third Tchebychev polynomial curve passes through the first Tchebychev polynomial curve at time T1max;

wherein if time T2max is greater than time T1max then the third Tchebychev polynomial curve passes through the second Tchebychev polynomial curve at time T2max;

wherein if time T1max is equal to time T2max then the third Tchebychev polynomial curve passes through whichever Tchebychev polynomial curve of the first and second Tchebychev polynomial curves has a higher severity at time T1max.

9. A computer, comprising a processor, a memory, and a computer readable storage device, the storage device containing program instructions executable by the processor via the memory to implement a method of estimating risk of a future failure of a first and second computer system of a computer network and taking remedial action which minimizes the risk of the future failure of the first and second computer systems, the method comprising:

said processor generating a first Tchebychev polynomial curve passing through first data points respectively representing previous failures of the first computer system, and identifying peaks and ends of the first Tchebychev polynomial curve, each first data point having a first coordinate on a time axis and a second coordinate on a severity axis, said first and second coordinate of each first data point respectively denoting a time of occurrence of the failure of the first computer system and a severity of the failure of the first computer system, said times of occurrence of the first data points encompassing a time range from an earliest time of occurrence T1min to a latest time of occurrence T1max, of the previous failures of the first computer system;

said processor generating a second Tchebychev polynomial curve passing through second data points respectively representing previous failures of the second computer system, and identifying peaks and ends of the second Tchebychev polynomial curve, each second data point having a second coordinate on the time axis and a second coordinate on the severity axis, said first and second coordinate of each second data point respectively denoting a time of occurrence of the failure of the computer system and a severity of the failure of the second computer system, said times of occurrence of the second data points encompassing a time range from an earliest time of occurrence T2 min to a latest time of occurrence T2max, of the previous failures of the second computer system;

said processor generating a third Tchebychev polynomial curve passing through: (i) all of the peaks of both the first Tchebychev polynomial curve and the second Tchebychev polynomial curve, (ii) the first Tchebychev polynomial curve at time T1 min or the second Tchebychev polynomial curve at time T2 min, and (iii) the first Tchebychev polynomial curve at time T1 max or the second Tchebychev polynomial curve at time T2 max; and said processor identifying a highest peak of the third Tchebychev polynomial curve and determining that the identified highest peak is a high risk failure that occurred on the first or second computer system and is a disaster generating significant risk to the computer network and in response, causing other computers of the computer network to provide additional redundancy to minimize the significant risk to the computer network from a future occurrence of the high risk failure of the first and second computer systems.

10. The computer system of claim 9, the method further comprising:

said processor identifying an additional failure of the first computer system, said additional failure occurring within a predetermined time period of one of the failures of the first computer system, a severity of the one failure of the first computer system being greater than a severity of the additional failure; and said processor determining not to use the additional failure as a data point for generating the first Tchebychev polynomial based on (a) the additional failure occurring within the predetermined time of the one failure of the first computer system and (b) the severity of the one failure of the first computer system being greater than the severity of the additional failure.

11. The computer system of claim 9, wherein the first computer system comprises a first network of first computers including first software installed in the first computers, and wherein the second computer system comprises a second network of second computers including second software installed in the second computers.

12. The computer system of claim 9, wherein if time T1min is less than time T2 min then the third Tchebychev polynomial curve passes through the first Tchebychev polynomial curve at time T1min;

wherein if time T2 min is less than time T1min then the third Tchebychev polynomial curve passes through the second Tchebychev polynomial curve at time T2 min;

wherein if time T1min is equal to time T2 min then the third Tchebychev polynomial curve passes through whichever Tchebychev polynomial curve of the first and second Tchebychev polynomial curves has a higher severity at time T1min;

wherein if time T1max is greater than time T2max then the third Tchebychev polynomial curve passes through the first Tchebychev polynomial curve at time T1max;

wherein if time T2max is greater than time T1max then the third Tchebychev polynomial curve passes through the second Tchebychev polynomial curve at time T2max;

wherein if time T1max is equal to time T2max then the third Tchebychev polynomial curve passes through whichever Tchebychev polynomial curve of the first and second Tchebychev polynomial curves has a higher severity at time T1max.

* * * * *